(12) United States Patent
Lee et al.

(10) Patent No.: US 7,450,546 B2
(45) Date of Patent: Nov. 11, 2008

(54) MOBILITY MANAGEMENT METHOD USING AN IMPROVED NEIGHBOR GRAPH

(75) Inventors: In-Sun Lee, Seoul (KR); Kyung-Hun Jang, Suwon-si (KR); Min-Ho Shin, Laurel, MD (US); Sung-Jea Ko, Seoul (KR); Hye-Soo Kim, Seoul (KR)

(73) Assignees: Samsung Electronics Co., Ltd. (KR); The University of Maryland College Park, College Park, MD (US)

( * ) Notice: Subject to any disclaimer, the term of this patent is extended or adjusted under 35 U.S.C. 154(b) by 513 days.

(21) Appl. No.: 11/027,108

(22) Filed: Dec. 30, 2004

(65) Prior Publication Data

US 2005/0176429 A1   Aug. 11, 2005

Related U.S. Application Data

(60) Provisional application No. 60/533,637, filed on Dec. 31, 2003.

(30) Foreign Application Priority Data

Jul. 7, 2004   (KR) ...................... 10-2004-0052784

(51) Int. Cl.
*H04Q 7/00* (2006.01)
*H04Q 7/24* (2006.01)
*H04Q 7/20* (2006.01)
*H04L 12/28* (2006.01)

(52) U.S. Cl. ........................ 370/331; 370/338; 370/401; 455/436; 455/438; 455/439

(58) Field of Classification Search ................. 370/331, 370/338, 401; 455/436, 438, 439
See application file for complete search history.

(56) References Cited

U.S. PATENT DOCUMENTS

| 2004/0105415 A1* | 6/2004 | Fujiwara et al. | 370/338 |
| 2004/0196808 A1* | 10/2004 | Chaskar et al. | 370/331 |
| 2005/0138178 A1* | 6/2005 | Astarabadi | 709/227 |

\* cited by examiner

*Primary Examiner*—Barry W Taylor
(74) *Attorney, Agent, or Firm*—McNeely Bodendorf LLP

(57) ABSTRACT

Disclosed is a method for managing mobility of mobile nodes between heterogeneous networks in an IP-based mobile communication system including a plurality of access nodes for providing an IP service to mobile nodes located in their service areas and a neighbor graph server for supporting connection to the access nodes by the mobile nodes. The method includes classifying the access nodes according to available service level; classifying the mobile nodes according to required service level, generating service level neighbor graphs each including access nodes supporting the same service level; generating a mapping table for mapping the mobile nodes to the neighbor graphs according to service level required by the mobile node; and supporting movement of a mobile node between networks using the neighbor graph and the mapping table.

17 Claims, 9 Drawing Sheets

MOBILITY MANAGEMENT METHOD USING AN IMPROVED NEIGHBOR GRAPH

PRIORITIES

This application claims priority to a provisional application entitled "Mobility Management Method Using Improved Neighbor Graphs", filed in the United States Patent and Trademark Office on Dec. 31, 2003 and assigned Ser. No. 60/533,637, and under 35 U.S.C. § 119 to an application entitled "Mobility Management Method Using Improved Neighbor Graphs" filed in the Korean Intellectual Property Office on Jul. 7, 2004 and assigned Ser. No. 2004-52784, the contents of both of which are incorporated herein by reference.

BACKGROUND OF THE INVENTION

1. Field of the Invention

The present invention relates generally to a mobile communication system, and in particular, to a method for managing mobility between heterogeneous networks using a neighbor graph (NG) in a mobile communication system comprised of IP-based (Internet Protocol) heterogeneous networks.

2. Description of the Related Art

Generally, a mobile communication system performs a handoff when a mobile node (MN) moves from a service area of a current access node (AN) to a service area of another access node.

In a single communication network, because user selectable service requirements are extremely restrictive and all access nodes are similar to each other in their characteristics, during handoff, an access node is selected considering only mobility of a user, instead of considering user requirements.

However, communication networks for mobile communication, wireless local area network (WLAN), and mobile Internet, which have been independently developed and commercialized, are expected to be integrated in a next generation communication environment along with the development of IP technology supporting mobility, such as Mobile Internet Protocol (IP).

Because heterogeneous networks have different characteristics and provide different types of services, in order to receive a desired service, a user must select a network suitable for requirements of the corresponding service.

In a communication environment where such heterogeneous networks coexist, when a handoff is performed considering only mobility, if a new access node fails to satisfy user requirement, a quality of service (QoS) abruptly deteriorates, and in order to receive a required QoS, a mobile node repeatedly performs handover, causing a ping-pong phenomenon. A handoff delay due to the ping-pong phenomenon further deteriorates the QoS (also known as a "service level").

In a mobile communication network, neighbor graph (NG) is used as a technique for providing fast handoff between access nodes. Because a neighbor graph includes all latent movement paths in a wireless network, an access node can easily determine a possible handoff by searching the neighbor graph.

However, because an existing handoff method using the neighbor graph performs a handoff using only information on a neighbor access node in the same network, to which a mobile node is possibly handed off and does not consider operational situations of the access node, such as an available capability of the access node, it cannot support a seamless service based on a fast handoff in a real-time multimedia service that requires a wide available bandwidth.

Therefore, it is necessary to develop a neighbor graph technique that considers available capability of an access node for effective multimedia service and seamless handoff in a next generation mobile communication system based on heterogeneous networks.

SUMMARY OF THE INVENTION

It is, therefore, an object of the present invention to provide a mobility management method for providing an effective and reliable multimedia service in view of terminal mobility by applying a neighbor graph that was originally used only in the same network with Internet Protocol (IP) based heterogeneous networks.

It is another object of the present invention to provide a mobility management method for minimizing a handoff delay by dynamically performing a handoff, considering user's service requirement and available capability of access nodes.

It is further another object of the present invention to provide a mobility management method for providing a fast handoff and a seamless service based thereon by classifying access nodes according to available capability and reflecting the classification result in a neighbor graph and by dynamically updating the neighbor graph according to a change in operational situations of the access nodes.

To achieve the above and other objects, the present invention provides a mobility management method between heterogeneous networks in an IP-based mobile communication system including a plurality of access nodes for providing an IP service to mobile nodes located in their service areas and a neighbor graph server for supporting a connection to the access nodes by the mobile nodes. The method includes classifying the access nodes according to an available service level; classifying the mobile nodes according to a required service level, generating service level neighbor graphs, each comprised of access nodes supporting the same service level; generating a mapping table for mapping the mobile nodes to the neighbor graphs according to the service level required by the mobile node; and supporting movement of a mobile node between networks using the neighbor graph and the mapping table.

Preferably, a low-level neighbor graph includes access nodes included in a high-level neighbor graph. Preferably, the service level neighbor graphs are dynamically updated according to a change in communication environment of the access nodes.

Preferably, the neighbor graph updating includes analyzing a change in service level supported by the access nodes; and if a service level supported by at least one access node is changed, removing a corresponding access node from a neighbor graph corresponding to a service level before the change and adding the corresponding access node to a neighbor graph corresponding to a service level after the change.

Preferably, when a service level of the access node is changed from a low service level to a high service level, the method further includes maintaining a corresponding access node in a neighbor graph corresponding to a previous service level and adding the corresponding access node to a neighbor graph corresponding to a service level after the change.

Preferably, the mapping table is updated according to a change in service level required by the mobile nodes. The mapping table updating includes receiving a neighbor graph request message from a mobile node; searching the mapping table for the mobile node that transmitted the neighbor graph request message; registering the mobile node in a mapping table if the mobile node is not registered in the mapping table; mapping the mobile node to a neighbor graph including the access node and corresponding to a requested service level according to the requested service level information and access node information included in the neighbor graph request message; and transmitting the mapped neighbor graph to the mobile node.

Additionally, the mapping table updating further includes mapping the mobile node to a neighbor graph corresponding to a changed requested service level in the mapping table when the mobile node is registered in the mapping table but the requested service level included in the neighbor graph request message is changed.

The mapping table updating includes mapping the mobile node to a neighbor graph including a new access node and corresponding to a service level requested by the mobile node when the mobile node is registered in the mapping table, the requested service level is not changed, and information on the new access node is included.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A mobility management method in a communication system comprised of IP-based heterogeneous networks according to a preferred embodiment of the present invention will now be described in detail with reference to the annexed drawings.

The present invention extends a neighbor graph that was used in an existing local area network (LAN) to a communication system comprised of Internet Protocol (IP) based heterogeneous networks, and classifies access nodes (ANs) on the entire neighbor graph according to an available network capability. The classified access nodes constitute a neighbor graph for each class.

If its service environment is changed, each access node transmits information on the change to a neighbor graph server (NGS), and the neighbor graph server updates a neighbor graph based on the information and transmits the updated neighbor graph to all access nodes associated with a corresponding access node.

Figure 1:
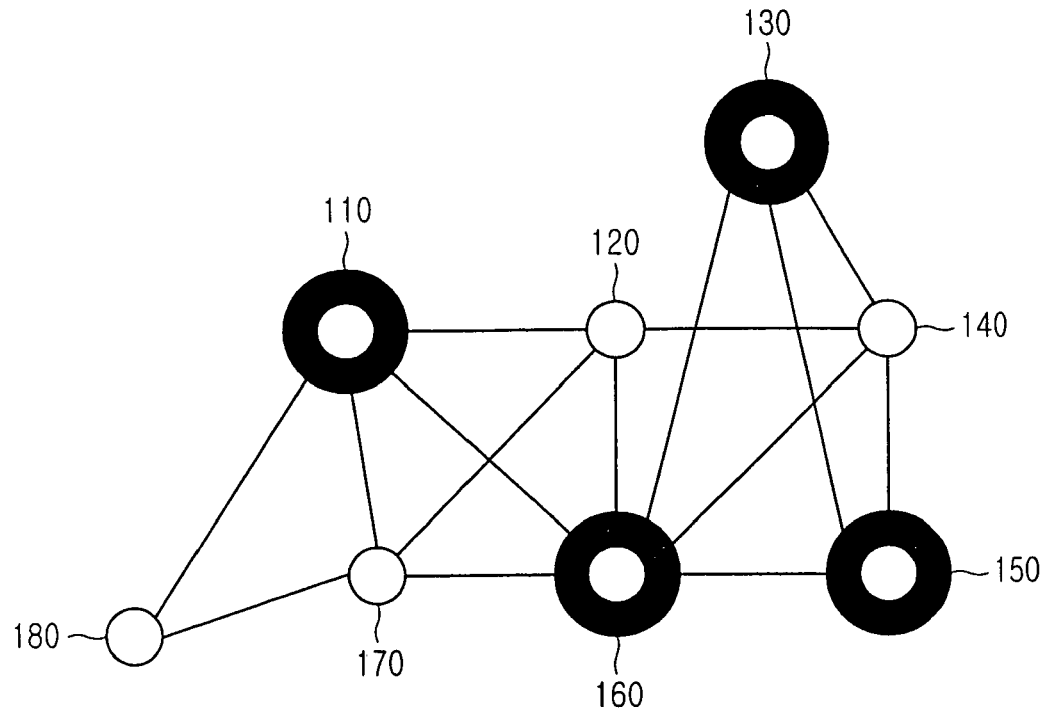
FIG. 1 is a diagram illustrating a hierarchical neighbor graph generated by a mobility management method according to a preferred embodiment of the present invention.

FIG. 1 is a diagram illustrating a hierarchical neighbor graph generated by a mobility management method according to a preferred embodiment of the present invention. In this embodiment, for the convenience of explanation, service levels (or QoSs) provided by access nodes are classified into two levels of service.

The hierarchical neighbor graph of FIG. 1 is comprised of four first-level access nodes 120, 140, 170 and 180 providing a first-level service, and four second-level access nodes 110, 130, 150 and 160 providing a second-level service.

Figure 2:
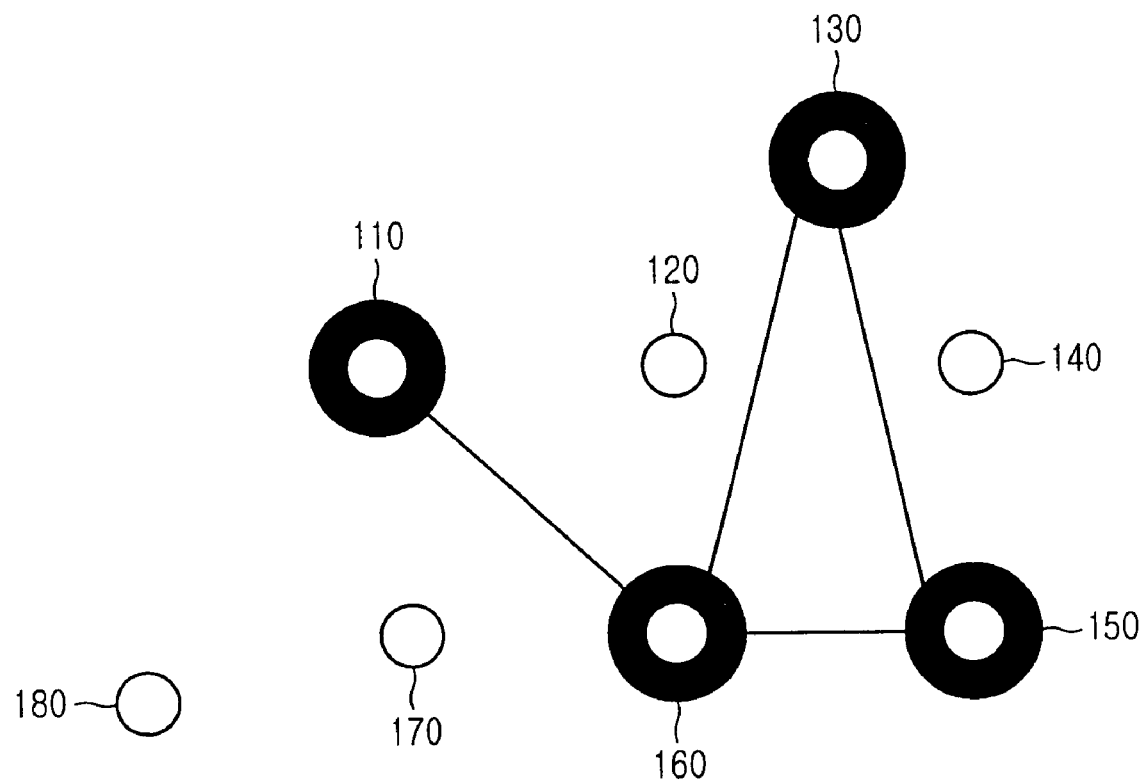
FIG. 2 is a diagram illustrating a neighbor graph comprised of access nodes with the same service level in the hierarchical neighbor graph of FIG. 1.

FIG. 2 is a diagram illustrating a second-level neighbor graph in the neighbor graph of FIG. 1. The second-level neighbor graph is comprised of the second-level access nodes 110, 130, 150 and 160 among access nodes constituting the hierarchical neighbor graph.

Figure 3:
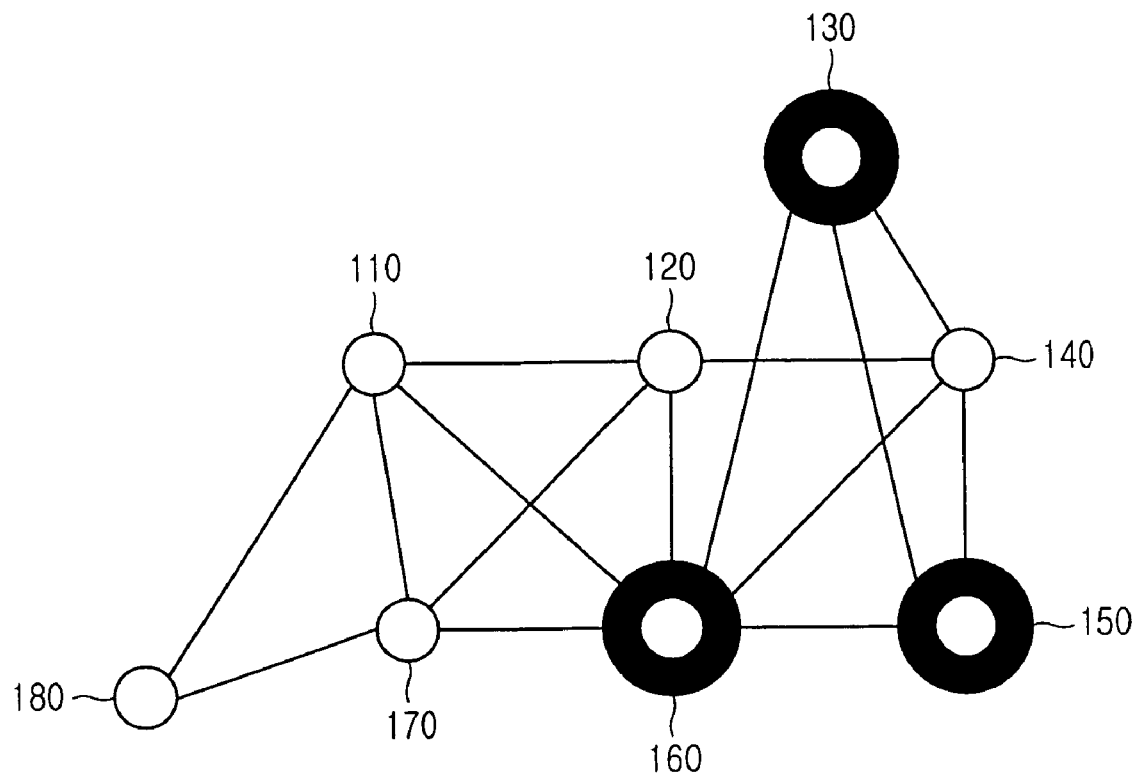
FIG. 3 is a diagram illustrating the neighbor graph of FIG. 1 after being updated by a mobility management method due to a change in communication environment according to an embodiment of the present invention.

FIG. 3 is a diagram illustrating the neighbor graph of FIG. 1 after being updated by a mobility management method according to an embodiment of the present invention due to a change in a communication environment.

Comparing the diagram of FIG. 1 with that of FIG. 3, it can be noted that one access node 110 among the second-level access nodes is changed to a first-level access node after updating. The updated neighbor graph is transmitted to all access nodes 120, 160, 170 and 180 associated with the corresponding access node 110.

The neighbor graph is managed by a neighbor graph server. Each access node transmits a service environment change message to the neighbor graph server periodically or each time its service environment is changed, and the neighbor graph server updates the neighbor graph based on the service environment change message received from each access node.

The updated neighbor graph is transmitted to all access nodes associated with the corresponding access node, so that all the associated access nodes share the same neighbor graph and the neighbor graph is downloaded by mobile nodes (MNs) located in a service area of each access node.

Figure 4:
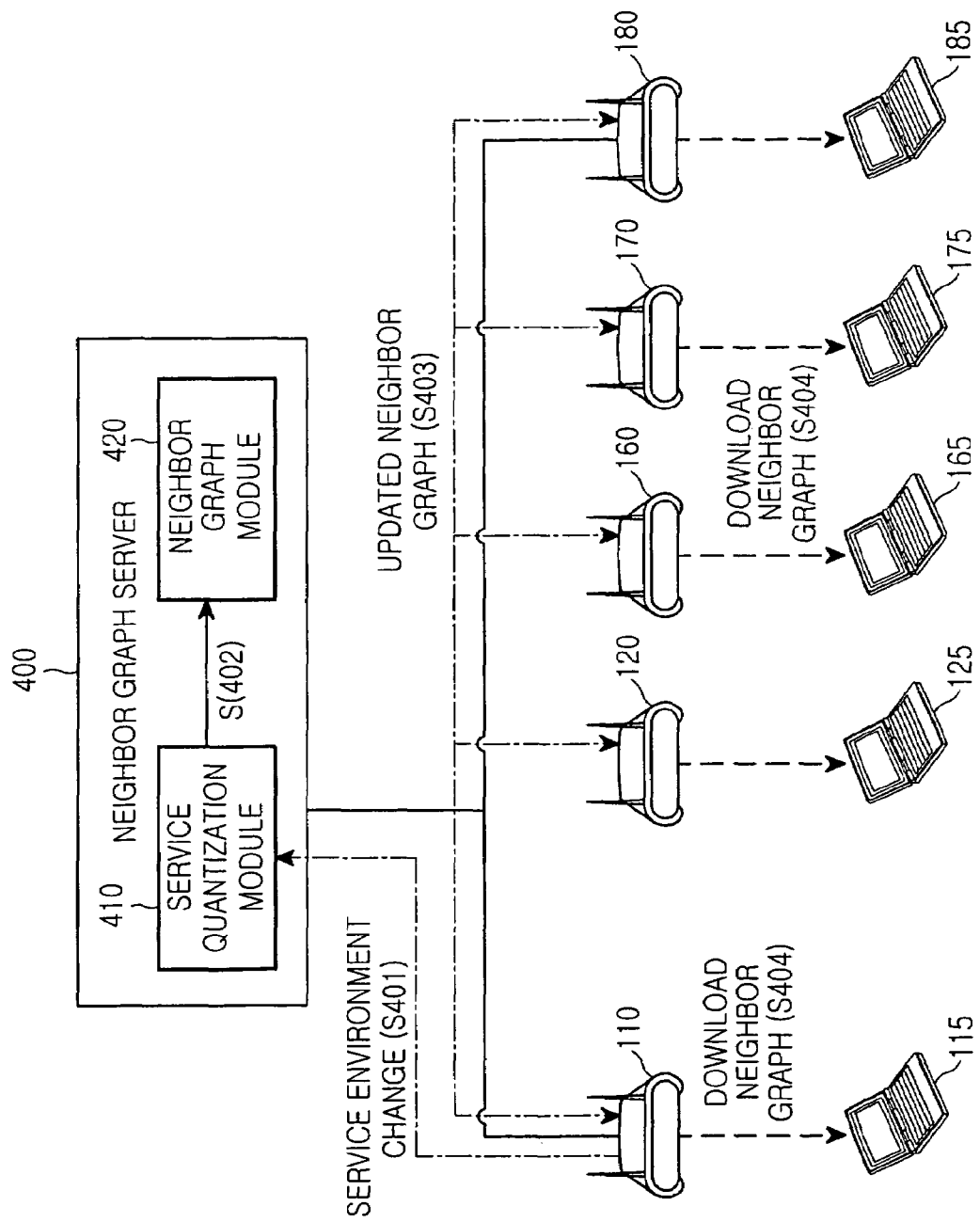
FIG. 4 is a diagram illustrating a procedure for updating a neighbor graph in a mobility management method according to a preferred embodiment of the present invention.

FIG. 4 is a diagram illustrating a procedure for updating a neighbor graph in a mobility management method according to a preferred embodiment of the present invention. As illustrated in FIG. 4, access nodes 110, 120, 160, 170 and 180 providing various services in their service areas are connected to a neighbor graph server 400 via an IP network. The access nodes 110, 120, 160, 170 and 180 provide services requested by mobile nodes 115, 125, 165, 175 and 185 located in their respective service areas.

The neighbor graph server 400 classifies the access nodes 110, 120, 160, 170 and 180 into a first-service level group of second, seventh and eighth access nodes 120, 170 and 180, and a second-service level group of first and sixth access nodes 110 and 160 according to service capability, generates the neighbor graph illustrated in FIG. 1 considering the classification result, and transmits the generated neighbor graph to the access nodes. Therefore, the access nodes 110, 120, 160, 170 and 180 share the same neighbor graph.

If available service capability of the access node 110 is changed from a second service level to a first service level in a state where the same neighbor graph is shared by the access nodes, the first access node 110 informs the neighbor graph server 400 of the change in service level through a service environment change message, as depicted by line S401. Upon receiving the service environment change message, the neighbor graph server 400 updates the neighbor graph to reflect the diagram shown in FIG. 3 based on the change information from the first access node 110. In the updated neighbor graph illustrated in FIG. 3, it is shown that the first access node 110 supports a first service level.

The neighbor graph server 400 is comprised of a service quantization module 401 and a neighbor graph module 420. The service quantization module 410 updates a level of the first access node 110 according to the received service environment change message, and delivers level information of the corresponding access node to the neighbor graph module 420, as depicted by line S402. The neighbor graph module 420 updates a neighbor graph using the level information of the access node, and transmits the updated neighbor graph to all associated access nodes, as depicted by line S403. In this way, all associated access nodes update their current neighbor graphs by receiving the updated neighbor graph from the neighbor graph server 400, so all access nodes share the same neighbor graph. The updated neighbor graph is downloaded to mobile nodes located in a service area of a corresponding access node, as depicted by line S404.

Figure 5:
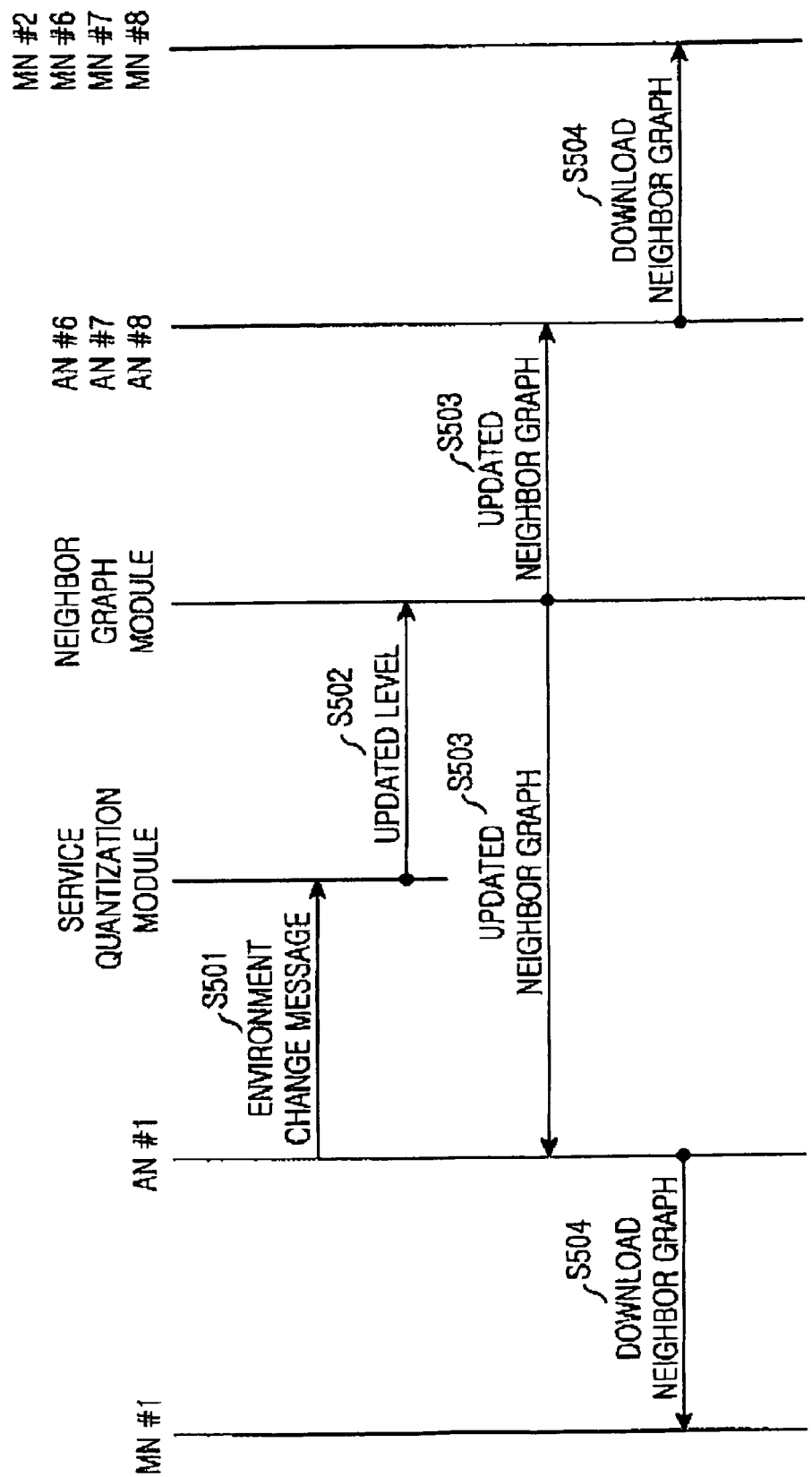
FIG. 5 is a message flow diagram illustrating a detailed procedure for updating a neighbor graph in a mobility management method according to a preferred embodiment of the present invention.

FIG. 5 is a message flow diagram illustrating a detailed procedure for updating a neighbor graph in a mobility management method according to a preferred embodiment of the present invention. If available service capability of a first access node AN#1 among access nodes AN#1, AN#6, AN#7 and AN#8 sharing the same neighbor graph managed by a neighbor graph server 400 (FIG. 4) is changed, in step S501 the first access node AN#1 informs the neighbor graph server 400 of the change through a service environment change message. Upon receiving the service environment change message, a service quantization module of the neighbor graph server 400 updates a level of the first access node AN#1 according to the received service environment change message, and delivers an updated level message to a neighbor graph module in step S502. The neighbor graph module updates a neighbor graph according to the updated level message, and transmits, in step S503, the updated neighbor graph to the access node AN#1 and access nodes, AN#6, AN#7 and AN#8 associated with the first access node AN#1. The access nodes AN#1, AN#6, AN#7 and AN#8 receiving the updated neighbor graph replace the current neighbor graph with the newly received neighbor graph, and in step S504, the replaced neighbor graph is downloaded by mobile nodes MN#1, MN#2, MN#6, MN#7 and MN#8 located in service areas of the corresponding access nodes.

The neighbor graph server 400 can include a plurality of neighbor graphs for each level, each containing of access nodes having the same service level, in a mobile node-neighbor graph mapping table connected to mobile nodes with a corresponding requested service level. Because access nodes with a high service level can provide services that access nodes with a low service level provide, a low-level neighbor graph can include access nodes with a high service level.

Figure 6:
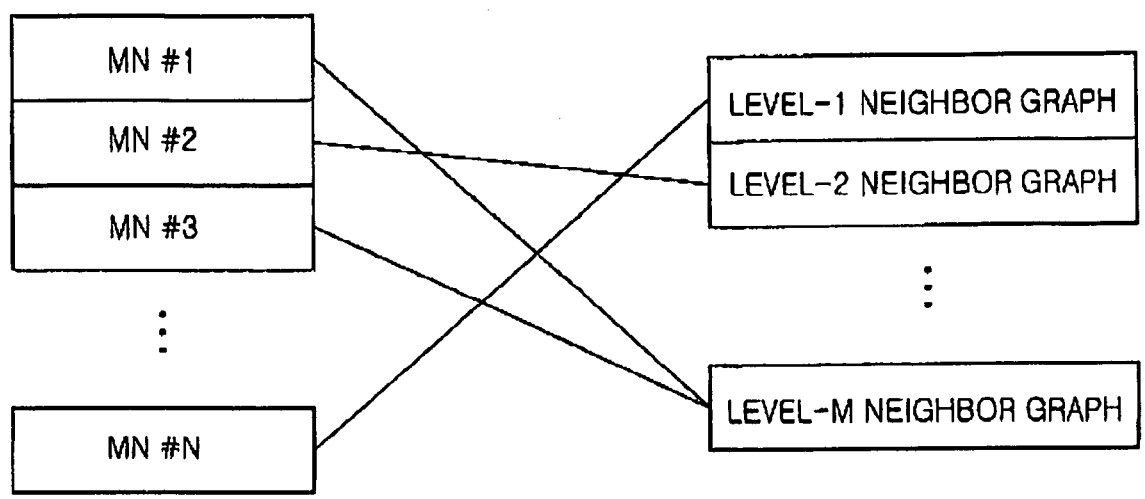
FIG. 6 is a diagram illustrating a mobile node-neighbor graph mapping table managed by a neighbor graph server in a mobility management method according to a preferred embodiment of the present invention.

FIG. 6 is a diagram illustrating a mobile node-neighbor graph mapping table managed by a neighbor graph server in a mobility management method according to a preferred embodiment of the present invention. In FIG. 6, a mobile node #1 and a mobile node #3 require the same service level and are mapped to a neighbor graph of a level M corresponding to the required service level, a mobile node #2 is mapped to a level-2 neighbor graph, and a mobile node #N is mapped to a level-1 neighbor graph.

The mobile node-neighbor graph mapping table is mapped according to a neighbor graph request signal from a mobile node when the mobile node first sends a connection request to an access node registered in the neighbor graph server, a service level required by the mobile node is changed, or the mobile node attempts a handoff to a new access node.

Figure 7:
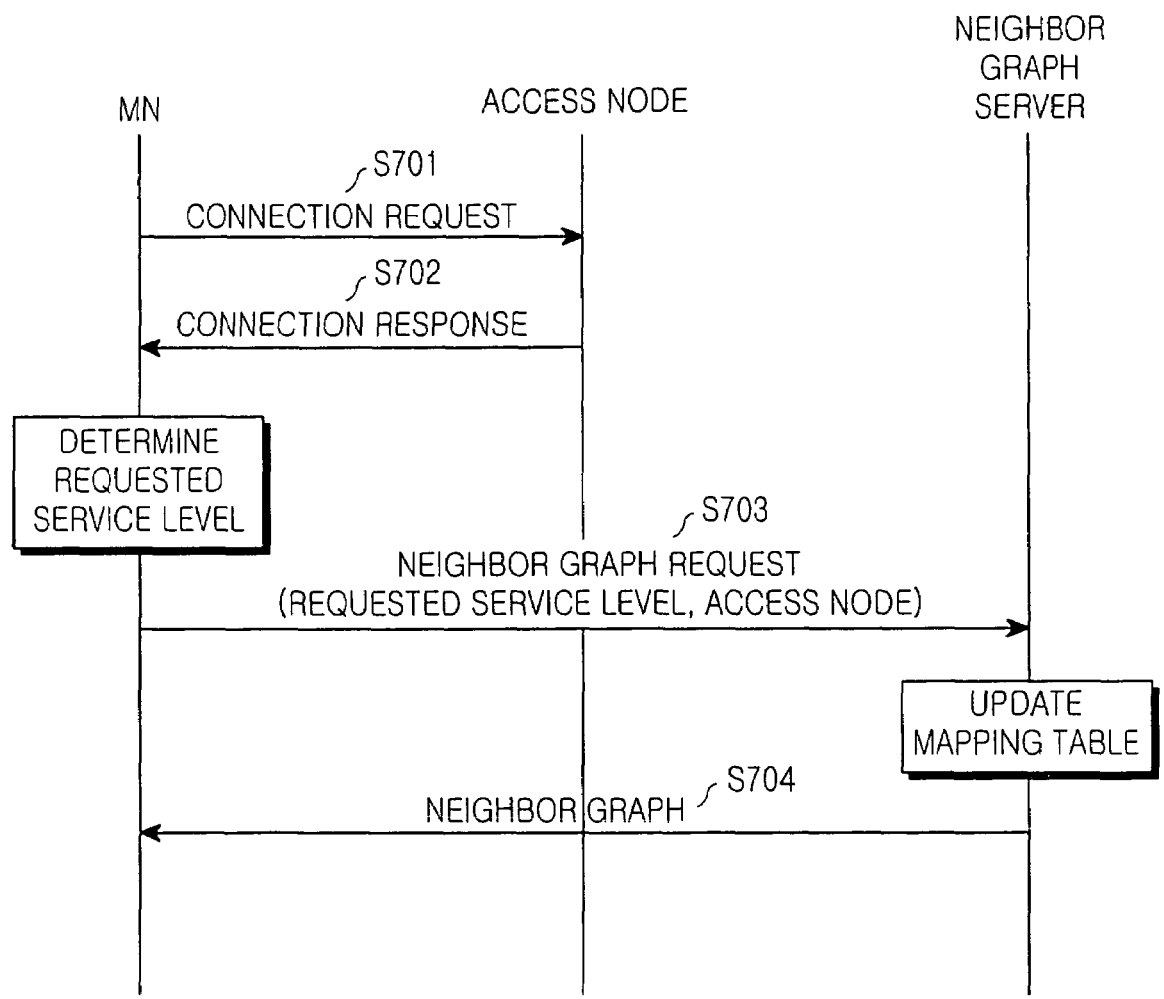
FIG. 7 is a message flow diagram illustrating a procedure for updating a mapping table when a mobile node first sends a connection request to an access node registered in the neighbor graph server according to an embodiment of the present invention.

FIG. 7 is a message flow diagram illustrating a procedure for updating a mapping table when a mobile node first sends a connection request to an access node registered in the neighbor graph server. Referring to FIG. 7, in step S701, a mobile node (MN) sends a connection request message to an access node. If in step S702, a connection response message is received from the access node in response to the connection request message, in step S703, the mobile node transmits a neighbor graph request message including its required service level (QoS) and information on a corresponding access node to a neighbor graph server. In step S704, the neighbor graph server receiving the neighbor graph request message registers the corresponding mobile node in the mobile node-neighbor graph mapping table according to the required service level and transmits a neighbor graph corresponding to a service level of the corresponding mobile node to the mobile node.

Figure 8:
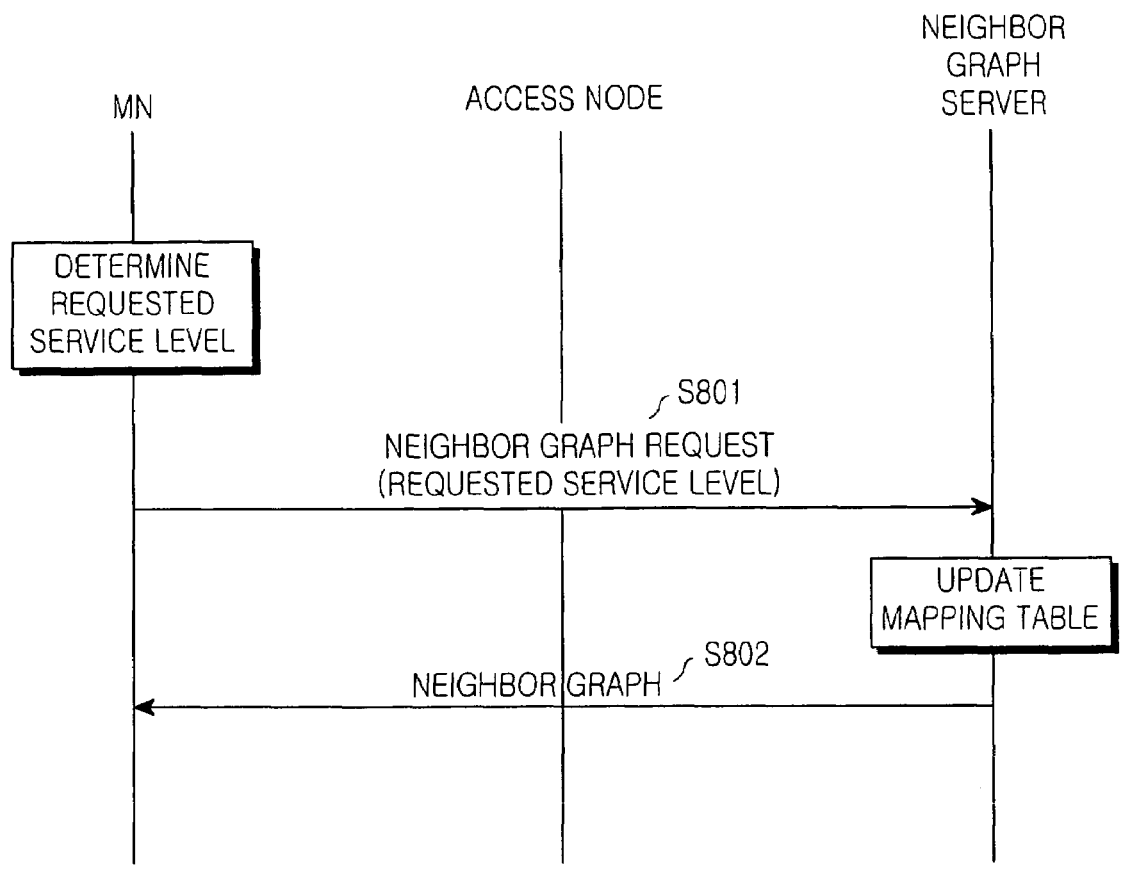
FIG. 8 is a message flow diagram illustrating a procedure for updating a mapping table when a service level requested by a mobile node is changed according to an embodiment of the present invention.

FIG. 8 is a message flow diagram illustrating a procedure for updating a mapping table when a service level requested by a mobile node is changed. Referring to FIG. 8, when a service level required by a mobile node is changed, the mobile node transmits, in step S801, a neighbor graph request message including information on the changed service level to a neighbor graph server. The neighbor graph server receiving the neighbor graph request message maps a corresponding mobile node to a neighbor graph corresponding to the changed service level according to the information on the changed service level and transmits a newly mapped neighbor graph to the mobile node in step S802.

Figure 9:
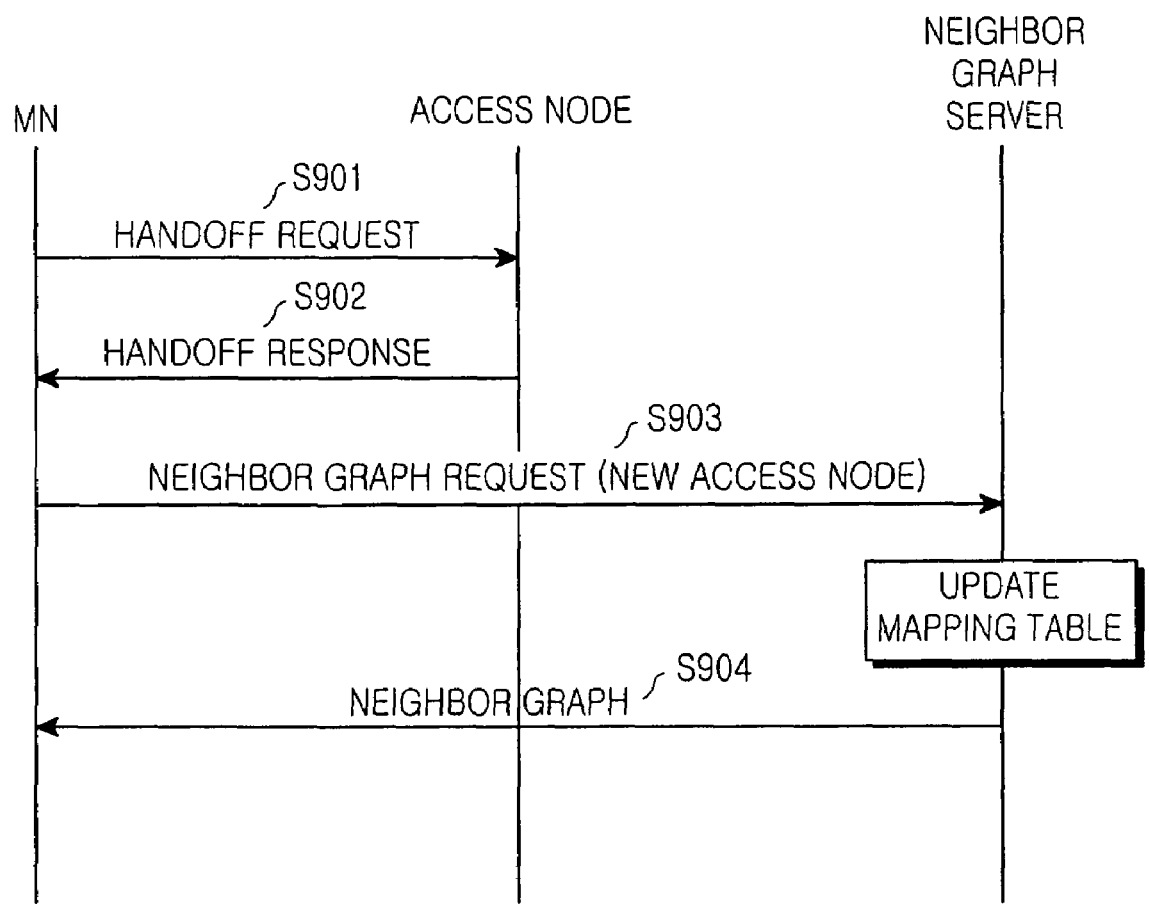
FIG. 9 is a message flow diagram illustrating a procedure for updating a mapping table when a mobile node attempts handoff to a new access node according to an embodiment of the present invention.

FIG. 9 is a message flow diagram illustrating a procedure for updating a mapping table when a mobile node attempts handoff to a new access node. Referring to FIG. 9, when a mobile node determines a handoff to a new access node, in step S901, the mobile node transmits a handoff request message to a new access node. In step 902, a handoff response message is transmitted from the access node to the MN. If the handoff response message is received from the new access node in response to the handoff request message, in step S903, the mobile node transmits a neighbor graph request message including information on the new access node to a neighbor graph server. Upon receiving the neighbor graph request message, the neighbor graph server maps the mobile node to a neighbor graph including the new access node and corresponding to a service level requested by the mobile node, and transmits the newly mapped neighbor graph to the mobile node in step S904.

As described above, a method for managing mobility between heterogeneous networks according to the present invention dynamically performs a handoff, considering user's service requirement and available capability of access nodes, thereby minimizing a handoff delay.

In addition, the mobility management method between heterogeneous networks according to the present invention classifies access nodes according to available capability, reflects the classification result in a neighbor graph, and dynamically updates the neighbor graph according to a change in communication environment of access nodes, thereby providing fast handoff and seamless service based thereon.

Furthermore, the mobility management method between heterogeneous networks according to the present invention classifies mobile nodes according to required service level, generates a mapping table for mapping the mobile nodes to a neighbor graph of a corresponding service level, and dynamically updates the mapping table according to a service level required by the mobile node and a change in service environment of access nodes, thereby applying an optimal neighbor graph and supporting mobility between networks.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of managing mobility of a plurality of mobile nodes between heterogeneous networks in an Internet Protocol (IP) based mobile communication system including a plurality of access nodes for providing an IP service to mobile nodes located in their service areas and a server for supporting connection to the access nodes by the mobile nodes, the method comprising the steps of:
    classifying the access nodes according to an available service level;
    generating service level contexts, each containing of access nodes (ANs) having the same service level;
    performing a handoff using a context corresponding to a service level required by a mobile node during movement of the mobile node between the networks; and
    updating the service level contexts when at least one of the access nodes experiences a change in the service level, wherein the service level context updating step further comprises the steps of:
        informing the server of the change through a service level change message sent by the access node that experienced the change in service level; and
        removing, by the server, a corresponding access node from a service level context for a previous service level and adding the corresponding access node to a new service level context according to the service level change message.

2. The method of claim 1 wherein a context for a low service level among the service level contexts includes access nodes with a high service level.

3. The method of claim 1, further comprising the step of maintaining the corresponding access node included in the previous service level context when a service level of the access node is changed from a low service level to a high service level.

4. The method of claim 1, wherein the service level context updating step includes the steps of:
    transmitting the updated service level context to access nodes associated with the corresponding access node; and
    downloading the updated service level context by the mobile nodes.

5. The method of claim 4, wherein the service level context downloading is performed when the mobile node first accesses an access node.

6. The method of claim 5, wherein the service level context downloading step comprises the steps of:
    sending a connection request to the access node by a mobile node;
    determining a service level upon receiving a connection response in response to the connection request;
    transmitting a service level context request message including information on the service level and the access node to the server;
    registering a service level of the mobile node by the server; and
    transmitting a corresponding service level context to the mobile node.

7. The method of claim 4, wherein the service level context downloading is performed when a service level of a mobile node has been changed.

8. The method of claim 7, wherein the service level context downloading step comprises the steps of:
    transmitting a service level context request message including the changed service level to the server;
    updating a service level of a corresponding registered mobile node by the server upon receiving the service level context request message; and
    transmitting a service level context corresponding to the updated service level to the mobile node.

9. The method of claim 4, wherein the service level context downloading is performed when handover occurs.

10. The method of claim 9, wherein the service level context downloading step includes the steps of:
    transmitting, by the mobile node, a handoff request message to a target handoff access node;
    upon receiving a handoff response message in response to the handoff request message, transmitting a service level context request message including information on the target handoff access node to the server;
    detecting a service level of a corresponding registered mobile node by the server upon receiving the service level context request message; and
    transmitting a service level context corresponding to the detected service level to the corresponding mobile node.

11. A method for managing mobility of a plurality of mobile nodes between heterogeneous networks in an Internet Protocol (IP) based mobile communication system including a plurality of access nodes for providing an IP service to mobile nodes located in the service areas of the access nodes and a neighbor graph server for supporting connection to the access nodes by the mobile nodes, the method comprising the steps of:
    registering access nodes and mobile nodes;
    classifying the registered access nodes according to an available service level;
    generating one or more service level neighbor graphs, each comprised of access nodes supporting the same service level;
    classifying the mobile nodes according to a required service level;
    generating a mapping table for mapping the mobile nodes to the neighbor graphs according to a service level;
    supporting movement of a mobile node between networks using the neighbor graphs and the mapping table; and
    dynamically updating the service level neighbor graphs according to a change in communication environment of the access nodes, wherein the neighbor graph updating step comprises the steps of:
        analyzing a change in a service level supported by the access nodes; and
        if the service level supported by at least one access node has been changed, removing a corresponding access node from a neighbor graph corresponding to a service level before the change and adding the corresponding access node to a neighbor graph corresponding to a service level after the change.

12. The method of claim 11, wherein a low-level neighbor graph among the service level neighbor graphs includes access nodes included in a high-level neighbor graph.

13. The method of claim 11, further comprising the step of, when a service level of the access node has been changed from a low service level to a high service level, maintaining a corresponding access node in a neighbor graph corresponding to a previous service level and adding the corresponding access node to a neighbor graph corresponding to the service level after the change.

14. The method of claim 11, further comprising the step of updating the mapping table when the mobile node first sends a connection request to an access node registered in the neighbor graph server, a service level requested by the mobile node has been changed, or the mobile node attempts a handoff to a new access node.

15. The method of claim 14, wherein the mapping table updating step further includes the steps of:
receiving a neighbor graph request message from a mobile node;
searching the mapping table for the mobile node that transmitted the neighbor graph request message;
registering the mobile node in a mapping table if the mobile node is not registered in the mapping table;
mapping the mobile node to a neighbor graph including the access node and corresponding to a requested service level according to requested service level information and access node information included in the neighbor graph request message; and
transmitting the mapped neighbor graph to the mobile node.

16. The method of claim 15, wherein the mapping table updating step further includes the step of mapping the mobile node to a neighbor graph corresponding to a changed requested service level in the mapping table when the mobile node is registered in the mapping table but the requested service level included in the neighbor graph request message has been changed.

17. The method of claim 16, wherein the mapping table updating step further includes the step of mapping the mobile node to a neighbor graph including a new access node and corresponding to a service level requested by the mobile node when the mobile node is registered in the mapping table, the requested service level has not changed, and information on the new access node has been included.

* * * * *